United States Patent
Kronogard

[11] 3,943,703
[45] Mar. 16, 1976

[54] COOLING PASSAGES THROUGH RESILIENT CLAMPING MEMBERS IN A GAS TURBINE POWER PLANT

[75] Inventor: Sven Olof Kronogard, Lomma, Sweden

[73] Assignee: United Turbine AB and Co., Kommanditbolag, Malmo, Sweden

[22] Filed: May 17, 1974

[21] Appl. No.: 471,176

[30] Foreign Application Priority Data
May 22, 1973 Sweden............................. 7307153

[52] U.S. Cl........... 60/39.16 R; 60/39.32; 60/39.66; 415/214; 416/214 A; 416/214 B; 416/244 A
[51] Int. Cl.²..... F02C 7/20; F02G 3/00; F01D 5/08
[58] Field of Search........ 60/39.16 R, 39.32, 39.66, 60/39.16 S; 415/200, 115, 95, 96, 116, 117, 214; 416/241 B, 244 A, 135

[56] References Cited
UNITED STATES PATENTS

| | | | |
|---|---|---|---|
| 2,297,508 | 9/1942 | Schütte | 416/244 A |
| 2,401,826 | 6/1946 | Halford | 415/115 |
| 2,555,965 | 6/1951 | Garber | 60/39.32 |
| 2,801,076 | 7/1957 | Terrell et al. | 416/241 |
| 2,874,932 | 2/1959 | Sörensen | 415/200 |
| 2,876,622 | 3/1959 | MacKay | 60/39.32 X |
| 2,919,549 | 1/1960 | Haworth et al. | 60/39.65 |
| 2,950,082 | 8/1960 | McVeigh | 416/244 A |
| 2,951,337 | 9/1960 | Atkinson et al. | 60/39.16 R |
| 3,186,168 | 6/1965 | Ormerod et al. | 60/39.32 |
| 3,266,248 | 8/1966 | Leslie | 60/39.16 SI |
| 3,507,113 | 4/1970 | Herrmann et al. | 60/39.16 SI |
| 3,546,879 | 12/1970 | Hass | 60/39.16 R |
| 3,797,236 | 3/1974 | Hooke et al. | 60/39.36 X |

*Primary Examiner*—Carlton R. Croyle
*Assistant Examiner*—Thomas I. Ross
*Attorney, Agent, or Firm*—Holman & Stern

[57] ABSTRACT

The parts of a gas turbine plant exposed to the highest temperature are made of ceramic material and are mounted by resilient clamping members permitting freedom for thermal movements. These clamping members are located in passages between spaces containing air and gas, respectively, with the air having the higher pressure. The clamping members are slotted to permit the flow of air through the passages in which they are mounted and will thus be effectively cooled.

5 Claims, 8 Drawing Figures

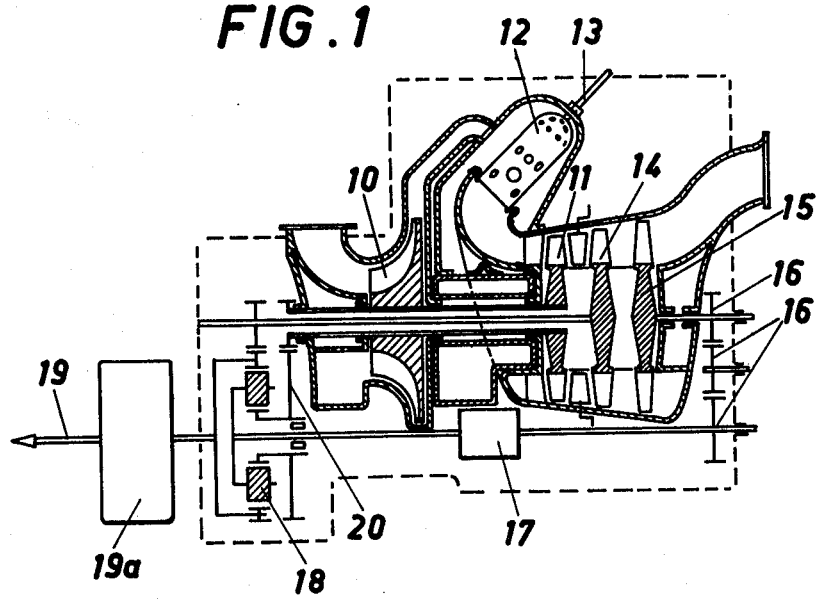
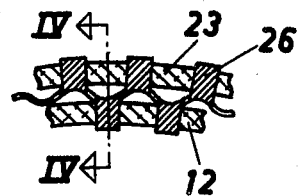
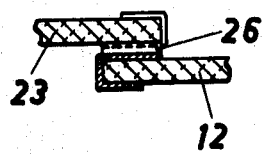
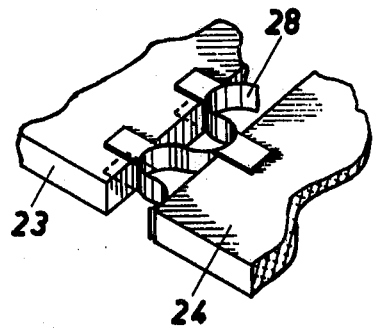

COOLING PASSAGES THROUGH RESILIENT CLAMPING MEMBERS IN A GAS TURBINE POWER PLANT

BACKGROUND OF THE INVENTION

One of the best ways of increasing the efficiency of a gas turbine plant is to raise the temperature of the operation cycle. One difficulty met therein is that a high temperature will reduce the useful life of the components and necessitates the use of expensive materials.

There are two ways of reducing above mentioned disadvantage, viz: to arrange air cooling of the components, or to use ceramic, sintered, non-metallic or semi-metallic, highly heat resisting materials.

The parts of the plant being especially exposed to the high temperature is, of course, the combustion chamber, and the first rotor stage as well as the passage means therebetween. These components, therefore, should be made of heat resistant material, and as it is difficult to arrange air cooling of the small and comparatively thin buckets present in the first turbine stage, i.e., usually the compressor driving turbine in an automotive plant, it is further desirable that this turbine stage will rotate at a noticeably lower speed than the following stage, i.e., usually the power turbine. Thus the mechanical stresses in the first named rotor may be kept at a reasonable value, which means a longer working life time without the use of expensive materials.

The heat resistant materials actual for this purpose will here below, for short, be termed ceramic materials, of which silicon nitride and silicon carbide are the most suitable. One important feature to be remembered when using ceramic materials, especially if they are used in direct contact with metallic materials, is the necessity to provide for thermal movements between components of metallic material and components of ceramic material.

SUMMARY OF THE INVENTION

The present invention relates to a gas turbine plant including at least one turbine rotor driving a compressor and at least one power turbine rotor as well as at least one combustion chamber communicating with the compressor. The invention is characterized in that the combustion chamber, the inlet means to the first turbine stage and at least the buckets thereof are made from ceramic material, and that said parts are built together within a common housing, that the border zones between said components are located in planes which to one side are passed by gases flowing from the combustion chamber, that said components are mounted with respect to the housing, or to adjacent components, respectively, by resilient clamping means having air passage openings, whereby each individual component has a possibility to perform thermal movements in at least one plane, and that at least one conduit is arranged to convey air from the compressor to the border planes between the components, by-passing the combustion chamber, with the clamping members being fitted in said border zones.

BRIEF DESCRIPTION OF THE DRAWINGS

FIG. 1 schematically shows the main components of the plant,

FIG. 3 shows a detail of a section along line III—III in FIG. 2, FIG. 4 shows a detail of a longitudinal section through the clamping means in FIG. 3, FIG. 5 shows a detail of a clamping means at V—V in FIG. 2, and FIGS. 6, 7 and 8 show different embodiments of turbine rotors.

DESCRIPTION OF SOME PREFERRED EMBODIMENTS

Figure 2:
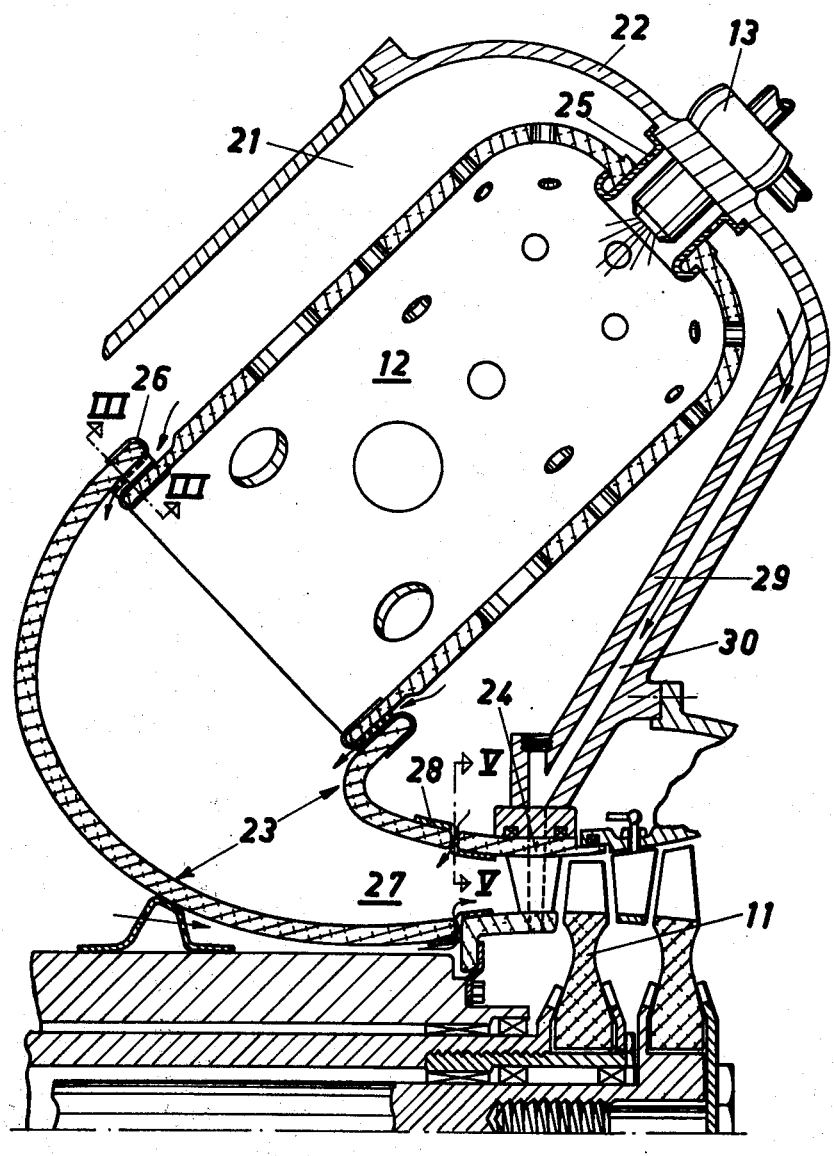
FIG. 2 shows a section through the combustion chamber and a portion of the first turbine stage.

The gas turbine power plant shown in FIG. 1 is on the first hand intended for automotive use and includes a compressor 10 driven by a turbine having a rotor 11. This compressor supplies air to a combustion chamber 12 having a burner 13. In series with the compressor turbine rotor 11, there are two further power turbine rotors 14 and 15, respectively. The latter is by a simple gear transmission 16 and a variable transmission 17 connected to a planetary gear 18. The turbine rotor 14 is also connected to last mentioned gear, with its shaft passing through the hollow shaft of the compressor turbine rotor 11.

An output shaft 19 is connected to the planetary gear by way of a reversing mechanism 19a. The compressor 10 and the turbine 11 are connected to the planetary gear 18 by way of a transmission 20, the reduction ratio of which is selected in a manner to permit the compressor and its turbine to rotate at a considerably lower speed than the two following power turbine rotors. This is possible as the compressor turbine is not forced to drive the compressor alone, at all loads, but may be augmented from the last turbine stage 15.

As has been mentioned above, it is essential that at least the components exposed to the highest thermal load are made of ceramic materials.

FIG. 2 shows a section through a somewhat modified embodiment of a combustion chamber suited to be used in a plant of the type actual here. The combustion chamber proper 12 is made in one piece of ceramic material and is mounted within an air box 21 connected to the pressure side of the compressor. The portion of the housing enclosing the combustion chamber is denoted by 22 and within the same, the burner 13 is fitted. An annular inlet member 23, likewise made of ceramic material, is fitted to the combustion chamber. The inlet member merges into a ring of inlet vanes 24 located immediately upstream of the compressor turbine rotor 11. The inlet vanes as well as the turbine rotor are made of ceramic material. The combustion chamber is connected substantially radially to the inlet member 23, and it is evident that the number of combustion chambers connected to the inlet member will depend upon the size of the plant.

In order to make possible thermal movements at the points where the ceramic components are mounted, the combustion chamber 12, on the first hand, is supported in the housing by means of slotted clamping members 25, which provide a certain resiliency of the suspension and furthermore allows the passage of air from the air box 21 for cooling the clamping members. These members will form an unsignificant portion of the complete system, and it will, therefore, be possible to use a very heat resistant and expensive material, without noticeably increasing the price of the plant.

Between the combustion chamber 12 and the inlet member 23, further resilient clamping members 26 are provided. FIGS. 3 and 4 show a cross section and a longitudinal section, respectively, through a detail of such a fitting. The portions of the clamping members located in the interspace between the combustion chamber and the inlet member are corrugated and are provided with turned down resilient tongues. The ceramic components will, in this manner, obtain freedom of movement in the radial direction, while simultaneously axial displacements are taken care of. Air may pass from the air box 21 into the inlet member by way of the corrugations, thereby cooling the clamping members.

The inlet member 23 merges into the ring of inlet vanes 24. This is formed as an annulus defined by two substantially parallel walls between which a number of inlet vanes 27 are fitted. Further slotted, resilient clamping members 28, of the type shown in FIG. 5, are fitted between the inlet member 23 and the guide vane ring 24. The corrugations are here arranged perpendicularly to the juxtaposed edge portions of the inlet member and the guide vane ring, respectively, and permit the flow of cooling air from the air box 21. An adjacent wall 29 of the housing sealingly abuts the outer wall of the guide vane ring 24 and includes an air passage 30 connected to the air box 21 upstream of the combustion chamber 12. Air may be conveyed by way of the passage 30 to the inlet vanes 27 and further to the turbine for cooling the components thereof.

Figure 6:
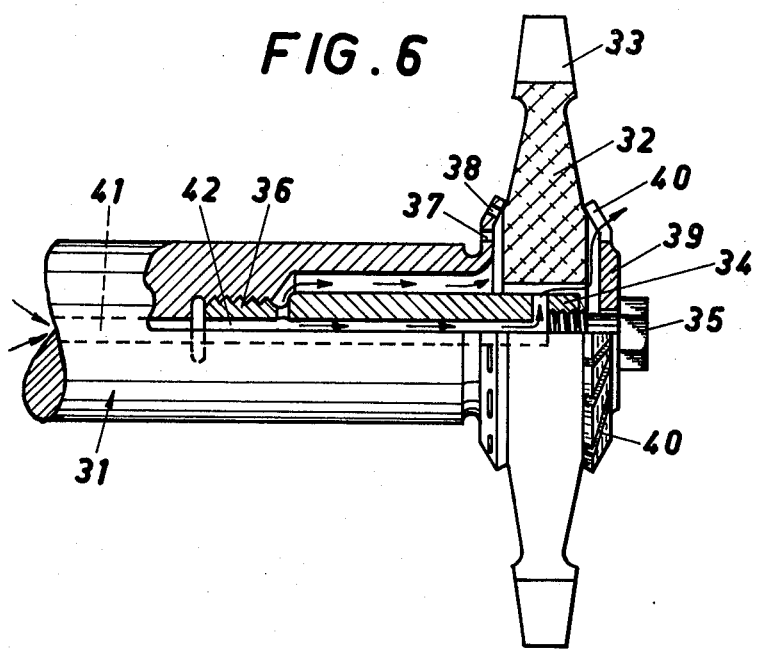
Figure 7:
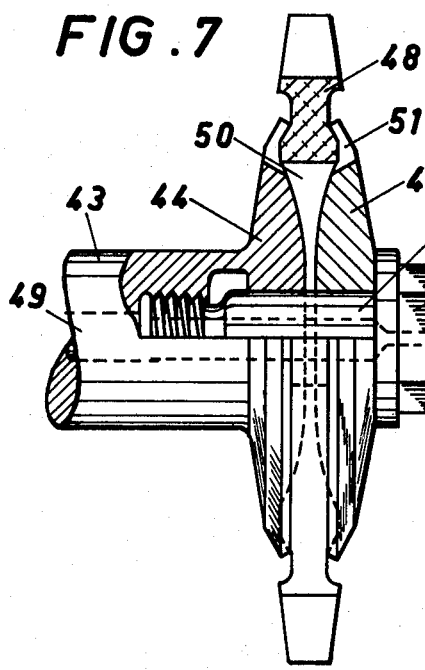
Figure 8:
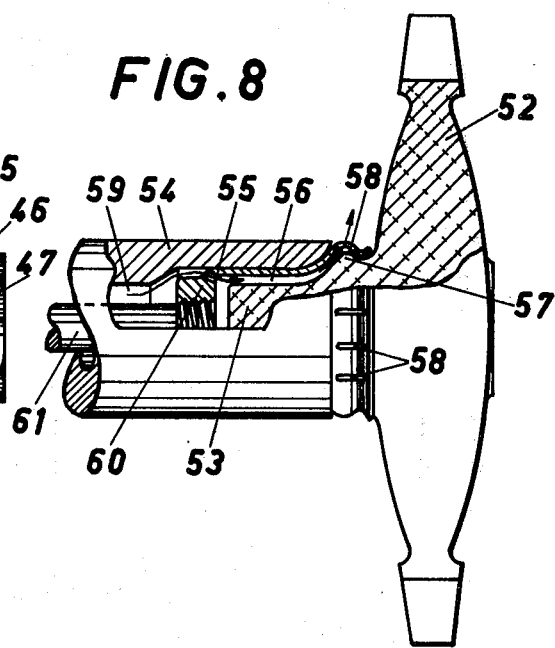

The turbine rotor may be formed in several different ways. Three principal embodiments are shown in FIGS. 6, 7 and 8. The turbine shaft is presupposed to be made of metallic material and it is necessary to attach the ceramic parts in an appropriate manner thereto. According to FIG. 6, a turbine rotor 32 is formed as a disc of ceramic material, having buckets 33 formed integrally with its peripheral portion. The buckets may be formed either directly when manufacturing the disc, or later on by separate working. The disc is mounted at a shaft 31 by means of a bolt 34 cooperating with a nut 35, with the bolt passing through a central passage in the disc and extending through a larger diameter bore in the metal shaft to be threadedly engaged with the latter at 36. The end portion of the shaft 31 turned towards the rotor disc is formed as a resilient flange 37 provided with slots 38. A resilient disc 39 having slots 40 fitted outwardly of the rotor disc. The slots 38 in the inward flange 37 are elongated in the peripheral direction, whereas the slots 40 in the outward disc are more or less radially directed. This is made purely for the purpose of illustration. It is evident that it is simpler to have the same shape of the slots to both sides of the rotor disc and that other shapes of the slots may be used, as circumstances so prescribe.

The shaft 31, as well as the bolt 34, is each provided with an axial bore 41 and 42, respectively, with said bores being connected to the compressor in any suitable manner (not shown), whereby cooling air may flow through the turbine shaft and further through the bolt 34 to cool the spaces between the flange 37, disc 39 and the rotor disc, respectively.

With the embodiment according to FIG. 7, the end of a turbine shaft 43 turned towards the rotor is formed as a disc 44, which cooperates with a mating disc 45. The latter is attached to the shaft in the same manner as described in connection with FIG. 6, i.e., by means of a bolt 46 cooperating with a nut 47. The peripheral portions of the two discs are formed as resilient claws, enclosing the root portions of buckets 48 made of ceramic material. Also here the shaft is provided with an axial bore 49 and a radially directed passage, 50 is formed between the two discs 44 and 45. By means of this passage air is conveyed outwards to the buckets and may pass out along the latter through slots 51 in the peripheral portions of the discs.

With the embodiment according to FIG. 8 a rotor disc 52 is provided with an integral shaft stub 53, instead of the central passage shown in the two previous embodiments. Hence the strength of the shaft will be increased considerably.

With this arrangement, which is the most attractive one considering strength and manufacture, the disc is mounted at shaft 54 by means of a sleeve member 55. The shaft 54 is provided with a tubular end portion and encloses the shaft stub 53 with a clearance, into which the sleeve member 55 is fitted.

A central, basically cylindrical portion 56 of the sleeve member is defined by a corrugated wall, which permits movements in the radial direction between the shaft stub 53 and the tubular portion of shaft 54. Adjacent to the disc, the shaft stub 53 is provided with an annular bead 57, and the enclosing portion of the sleeve is provided with a mating, annular recess, so the sleeve will resiliently hold the bead. The recessed portion of the sleeve is slotted to form a number of parallel tongues, and through slots 58 formed between the tongues, cooling air, supplied through a bore 59 in the shaft and passing through the corrugations in the cylindrical portion 56, may issue.

The end of sleeve 55 remote from the rotor disc is formed to a threaded fitting for a bolt 61, which attaches the sleeve, and thus also the rotor, to the shaft. The edge of the tubular end portion of the shaft is formed to force the sleeve towards the shaft stub, when the sleeve is pulled inwards and will thus bring about a compression of the ceramic material while simultaneously efficiently centering the rotor disc.

With respect to the alignment, the sleeve 55 has a corrugated (or fluted) main portion located between the hollow end of the shaft 54 and the inner end of the stub shaft. The annular recess 58 at the outer end of the sleeve fits around the annular bead 57. The corrugations and the grip around the bead 57 will ensure a satisfactory alignment. Moreover, the corrugations ensure resiliency in the axial direction with respect to thermal movements.

By means of the bolt 61, the bead 58 is drawn tight against the end of the metal shaft and will thus obtain a safe grip around the bead.

There are, in addition, contact faces along the edges of the corrugations between the metal sleeve and the stub shaft. The disc rotates at high speed and the engagement occurs at short radii so that the design is quite safe from the torque transmission viewpoint.

The inner end of the sleeve is formed in such a manner and provided with air passage slots, whereby an axial resiliency as regards thermal movements is ensured.

Besides the features mentioned, the slots at the inner and outer ends, plus the corrugations ensure an ample passage way for the cooling air. This should be supplied by the compressor in order that sufficient quantities be available. The best way of supplying the air is through the shaft, but difficulties develop when the air shall be transferred from the shaft out along the ceramic parts and the latter must be held absolutely rigid, due to thermal movements occuring.

All components made of ceramic material, thus have a satisfactory resilient suspension and the metallic clamping members will obtain an efficient air cooling.

What I claim is:

1. In a gas turbine power plant including a compressor, at least one turbine rotor driving the compressor, at least one further turbine rotor, downstream of the compressor driving turbine, delivering external power, at least one combustion chamber communicating with the compressor and providing combustion gases to the turbine rotors, the improvement comprising a hollow metal shaft, the compressor driving turbine rotor, located closest to the combustion chamber including a disc having integral vanes along its periphery, said rotor being formed of ceramic material, means resiliently deformable in a radial as well as an axial direction with respect to thermal movement enclosing a portion of said ceramic disc for centering and holding the same with respect to the hollow metal shaft, passage means for conveying air from the compressor to the hollow metal shaft, and said centering and holding means, forming extensions of the air passage through said hollow shaft between themselves and the juxtaposed ceramic faces, said holding means being further provided with apertures for directing air along the parts of the ceramic rotor outside said holding means.

2. The gas turbine power plant as claimed in claim 1 in which said ceramic disc is provided with a centrally located aperture, an outwardly turned fixed flange at the end of the hollow metal shaft adjacent to the disc, a separate flange of the same diameter as the fixed flange, and a bolt for attaching the separate flange to the metal shaft in juxtaposition to the fixed flange, with the fixed flange and the separate flange between themselves defining an extension of the air passage means and together constituting the resiliently deformable means centering and holding the ceramic disc of the compressor driving turbine rotor with respect to said shaft.

3. The gas turbine power plant as claimed in claim 1 in which the compressor driving turbine disc has a short, integral shaft stub, the hollow metal shaft having a tubular end portion enclosing the shaft stub with a clearance, said shaft stub having a root, an annular bead at the root, a sleeve member fitting in the clearance between the tubular end portion and the shaft stub, the sleeve member having a logitudinally corrugated main portion bridging the clearance between the tubular end portion and the shaft stub, an annular recess defined by resiliently deformable wall portions and mating with the annular bead at the root of the shaft stub at one of its ends, and means for attachment to the metal shaft at its opposite end, the attachment means and the walls of the annular recess being provided with slots constituting together with the corrugations in the main portion of the sleeve member part of the air passage means of the metal shaft.

4. The gas turbine power plant as claimed in claim 2 in which said fixed flange is provided with slots elongated in the peripheral direction and the separate flange with slots extending in a radial direction.

5. In a gas turbine power plant including a compressor, at least one turbine rotor driving the compressor, at least one further turbine rotor downstream of the compressor driving turbine, delivering external power, at least one combustion chamber communicating with the compressor and providing combustion gases to the turbine rotors, the improvement comprising a hollow metal shaft, the compressor driving turbine rotor located closest to the combustion chamber being at least partly of ceramic material and mounted on the hollow metal shaft, means resilient in a radial as well as an axial direction with respect to thermal movement holding the ceramic parts of the compressor driving turbine with respect to the hollow metal shaft, passage means for conveying air from the compressor to the hollow metal shaft, said resilient holding means being provided with apertures for directing air from the hollow metal shaft along the ceramic parts, the compressor driving turbine being defined by a disc of ceramic material, said disc having a short, integral shaft stub and integral blades along its periphery, the hollow metal shaft having a tubular end portion enclosing the shaft stub with a clearance, said shaft stub having a root, an annular bead at the root, a sleeve member fitting in the clearance between the tubular end portion and the shaft stub, the sleeve member having a longitudinally corrugated main portion bridging the clearance between the tubular end portion and the shaft stub, an annular recess defined by resilient wall portions and mating with annular bead at the root of the shaft stub at one of its ends, and means for attachment to the metal shaft at its opposite end, the attachment means and the walls of the annular recess being provided with slots constituting together with the corrugations in the main portion of the sleeve member part of the air passage means of the metal shaft.

* * * * *